United States Patent
Mo et al.

(10) Patent No.: US 8,464,047 B2
(45) Date of Patent: Jun. 11, 2013

(54) METHOD AND APPARATUS FOR AUTHORIZING HOST TO ACCESS PORTABLE STORAGE DEVICE

(75) Inventors: Sang-dok Mo, Suwon-si (KR); Sang-bum Suh, Seoul (KR); Sung-min Lee, Suwon-si (KR); Bok-deuk Jeong, Yongin-si (KR); Yong-ho Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 802 days.

(21) Appl. No.: 12/191,392

(22) Filed: Aug. 14, 2008

(65) Prior Publication Data

US 2009/0183256 A1 Jul. 16, 2009

(30) Foreign Application Priority Data

Jan. 15, 2008 (KR) ........................ 10-2008-0004435

(51) Int. Cl.
*G06F 21/00* (2006.01)
(52) U.S. Cl.
USPC .............................. 713/164; 713/193; 726/27
(58) Field of Classification Search
None
See application file for complete search history.

(56) References Cited

U.S. PATENT DOCUMENTS

| | | | |
|---|---|---|---|
| 7,743,422 B2* | 6/2010 | Narayanaswami et al. | 726/25 |
| 2004/0019790 A1 | 1/2004 | Aono et al. | |
| 2004/0123127 A1* | 6/2004 | Teicher et al. | 713/193 |
| 2005/0050363 A1 | 3/2005 | Naka et al. | |
| 2008/0046990 A1* | 2/2008 | Narayanaswami et al. | 726/9 |
| 2008/0098134 A1* | 4/2008 | Van Acht et al. | 710/33 |

FOREIGN PATENT DOCUMENTS

| | | |
|---|---|---|
| KR | 1020030084703 A | 11/2003 |
| KR | 1020070037782 A | 4/2007 |
| KR | 1020070038700 A | 4/2007 |
| WO | 2006/027723 A1 | 3/2006 |

OTHER PUBLICATIONS

Communication dated Jul. 17, 2012 issued by the Korean Intellectual Property Office in counterpart Korean Application No. 10-2008-0004435.
Communication dated Jan. 22, 2013, issued by the Korean Intellectual Property Office in counterpart Korean Application No. 10-2008-0004435.
Communication dated Apr. 4, 2013, issued by the Korean Intellectual Property Office in counterpart Korean Application No. 10-2008-0004435.

* cited by examiner

*Primary Examiner* — Hadi Armouche
*Assistant Examiner* — Izunna Okeke
(74) *Attorney, Agent, or Firm* — Sughrue Mion, PLLC

(57) ABSTRACT

A method and apparatus for authorizing a host to access a portable storage device and a method and apparatus of providing information for authorizing a host to access a portable storage device. The method includes: verifying integrity of host software requesting to transmit data; determining whether the host is authorized to access the portable storage device; and determining whether the host software is authorized to access the portable storage device. Accordingly, user information may be stored on the portable storage device and moved with security.

32 Claims, 7 Drawing Sheets

METHOD AND APPARATUS FOR AUTHORIZING HOST TO ACCESS PORTABLE STORAGE DEVICE

CROSS-REFERENCE TO RELATED PATENT APPLICATION

This application claims the benefit of Korean Patent Application No. 10-2008-0004435, filed on Jan. 15, 2008, in the Korean Intellectual Property Office, the disclosure of which is incorporated herein in its entirety by reference.

BACKGROUND OF THE INVENTION

1. Field of the Invention

The present invention relates to a portable storage device, and more particularly, to a method and apparatus for authorizing a host connected to a portable storage device and a method and apparatus for providing information for authorizing a host.

2. Description of the Related Art

Recent digital information devices such as a personal computer (PC), a personal digital assistant (PDA), a wireless terminal, and a digital television set (DTV) adopt portable storage devices such as a universal serial bus (USB) memory, a compact flash (CF) card, or a secure digital (SD) card.

On the other hand, there is known a virtualization based state migration technology, in which a virtual machine that has been operated in a virtual machine monitor (VMM) environment is suspended, and the suspended virtual machine is stored in a portable storage device, transported to a different host, and loaded on a VMM on the different host to resume its operation.

FIG. 1 is a diagram for describing an existing technology for protecting data stored in a portable storage device 110.

Referring to FIG. 1, a user connects the portable storage device 110 to a digital information device 100 (hereinafter, referred to as a host), such as a PC, a PDA, a wireless terminal, or a DTV. The host 100 encrypts data and stores it in the portable storage device 110 (120). In addition, the host 100 reads the encrypted data from the portable storage device 110 and decrypts it (130).

However, since the existing portable storage device 110 has a weak security infrastructure, a user's important information stored in the portable storage device 110 may be vulnerable to malicious attacks when the portable storage device 110 is stolen, lost, or connected to a host 100 infected by malware.

In addition, when the portable storage device 110 is applied to a virtualization based state migration technology, it is impossible to prevent the virtual machine stored in the portable storage device 110 from being used by an unauthorized host 100.

SUMMARY OF THE INVENTION

The present invention provides a method of authorizing a host in a portable storage device and a method and apparatus for providing information for authorizing a host, by which user information stored in a portable storage device can be protected from attacks by an unauthorized host or malware.

In addition, the present invention provides a method and apparatus for authorizing a host to access a portable storage device, a method and apparatus for providing information for authorizing a host to access a portable storage device in order to prevent a virtual machine, of which a state migrates in a virtualization based state migration technology, and a user's information from being used by an unauthorized host or malware.

According to an aspect of the present invention, there is provided a method of authorizing a host to access a portable storage device, the method comprising: verifying integrity of host software requesting to transmit data; determining whether the host is authorized to access the portable storage device; and determining whether the host software is authorized to access the portable storage device.

The verifying integrity of the host software may include receiving information regarding the integrity of the host software from the host, and wherein the host is secure-booted.

The determining whether the host is authorized to access the portable storage device is based on a host identification key received from the host.

The determining whether the host software is authorized to access the portable storage device is based on a host software identification key received from the host.

The method may further comprise, if the integrity of the host software is not verified or if it is determined that the host is not authorized to access the portable storage device, rejecting a data transmission request from the host software.

The method may further comprise, if the integrity of the host software is verified and if the it is determined that the host is authorized to access the portable storage device, permitting a data transmission request from the host software for data stored in a predetermined portion of a storage area of the portable storage device.

The data stored in the predetermined portion of the storage area may include a virtual machine suspended by another host for state migration, and the host software may include a virtual machine read from the portable storage device and resumed by the host.

The method may further comprise, if it is determined that the host software is authorized to access the portable storage device, permitting the data transmission request from the host software for the data stored in an entire storage area of the portable storage device.

A remaining portion except for the predetermined portion of the storage area may include an application program or user data.

The host may include one of a personal computer, a personal digital assistant (PDA), a wireless communication terminal, and a digital television (DTV) set.

The portable storage device may include one of a universal serial bus (USB) memory card, a compact flash (CF) card, and a secure digital (SD) card.

The host software may include one of a virtual machine operated in the host, an application program operated in the host, and a user interface program.

According to another aspect of the present invention, there is provided an apparatus for authorizing a host to access a portable storage device, the apparatus comprising: an integrity inspection unit which verifies in a verification, integrity of the host software requesting to transmit data; a first authentication unit which determines in a first determination, whether the host is authorized to access the portable storage device; a second authentication unit which determines whether the host software is authorized to access the portable storage device; and a control unit which controls transmitting the data to the host based on results of the verification, the first authorization determination, and the second authorization determination.

According to another aspect of the present invention, there is provided a method of providing information for authorizing a host to access a portable storage device, the method comprising: secure-booting the host; transmitting information regarding integrity of host software generated by the secure booting and a host identification key to a portable storage device; and if integrity inspection of the host software and authentication of the host are successful, transmitting a host software identification key to the portable storage device, wherein the host software requests transmission of data stored in the portable storage device.

According to another aspect of the present invention, there is provided an apparatus for providing information for authorizing a host to access a portable storage device, the apparatus comprising: a booting unit which secure-boots the host; a control unit which generates information regarding integrity of the host software based on a result of the secure booting, a host identification key, and a host software identification key; and a transmission unit which transmits information regarding integrity of the host software, a host identification key, and a host software identification key to the portable storage device, wherein the host software requests transmission of data stored in the portable storage device.

According to another aspect of the present invention, there is provided a computer readable medium having a computer program embodied thereon, the computer program for causing a computer to execute a method of authorizing a host to access a portable storage device, the method comprising: verifying integrity of host software requesting to transmit data; determining whether the host is authorized to access the portable storage device; and determining whether the host software is authorized to access the portable storage device.

According to another aspect of the present invention, there is provided a computer-readable medium having a computer program embodied thereon, the computer program for causing a computer to execute a method of providing information for authorizing a host, the method comprising: secure-booting the host; transmitting information regarding integrity of host software generated by the secure booting and a host identification key to a portable storage device; and if integrity inspection of the host software and authentication of the host are successful, transmitting a host software identification key to the portable storage device, wherein the host software requests transmission of data stored in the portable storage device.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE PRESENT INVENTION

The present invention will now be described in more detail with reference to the accompanying drawings.

Figure 1:
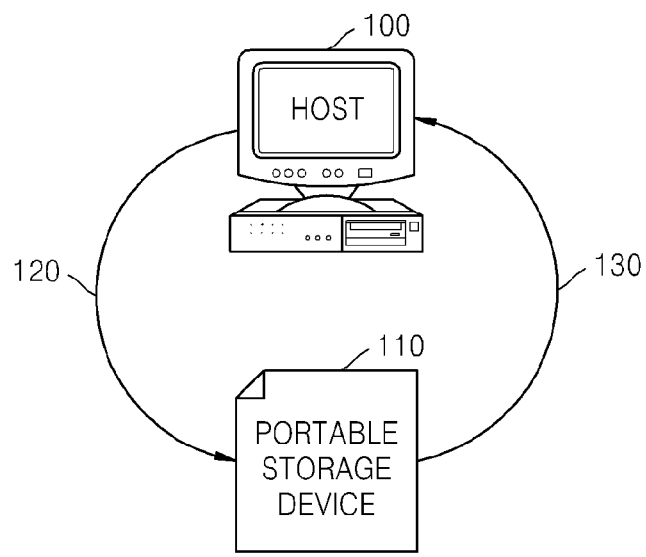
FIG. 1 is a schematic diagram for describing an existing technology for protecting data stored in a portable storage device.
Figure 2:
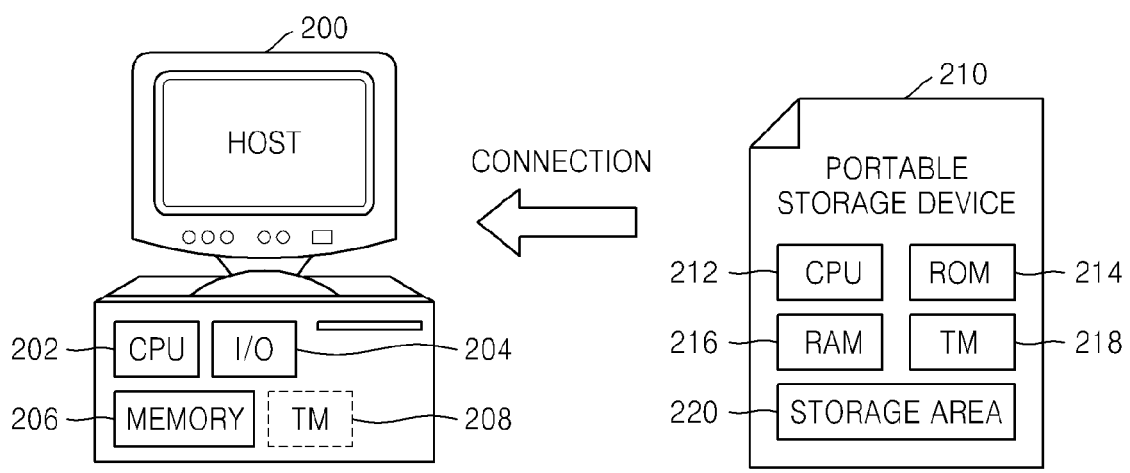
FIG. 2 is a schematic diagram illustrating a host 200 and a portable storage device 210 for implementing the present invention.

FIG. 2 is a schematic diagram illustrating a host 200 and a portable storage device 210 according to the present invention.

Referring to FIG. 2, the host 200 is a digital information device such as a personal computer (PC), a personal digital assistant (PDA), a wireless communication terminal, or a digital television (DTV) set, and is connected to a portable storage device 210, such as a USB memory, a CF card, or an SD card.

The host 200 comprises a control unit 202, an input/output (I/O) unit 204, and a memory device 206 in order to request transmission of data stored in the portable storage device 210 and receive the data from the portable storage device 210. The control unit 202 controls the entire operation of the host 200. The I/O unit 204 is an interface for inputting and outputting the data. The memory device 206 stores the data of the host 200.

The host 200 may further comprise a security module (also called a "trusted module") 208. The security module 208 is used to turn on the host 200 using a secure booting. When the secure booting is executed, it is possible to ensure that an operating system stored in the memory 206 of the host 200 is booted without arbitrary change. For example, when the host 200 is powered up, and booted by an operating system stored in the memory 206, the integrity of the stored operation system should be guaranteed. If the host 200 is booted without verifying the integrity of the operating system, a malicious user may normally operate the host. A method of facilitating the secure booting is already well known in the art, and thus its detailed description will be omitted.

Ultimately, the security module 208 may inspect integrity of a program operating in the host 200 in a fast manner without burdening the control unit 202. It is noted that the host 200 does not need to internally include the security module 208, and the secure booting may be executed using the security module 218 included in the portable storage device 210. This will be described in detail later.

On the other hand, the host 200 may be based on a virtualization technology which allows several operating systems to simultaneously operate using a virtual machine monitor (VMM). Therefore, the host 200 may operate a single operating system or a plurality of operation systems simultaneously on the VMM.

Herein, an environment in which each operating system operates in a VMM based environment is called a domain, and a single virtual machine may operate in each domain. In addition, the virtual machine refers to software operating in each domain. The host software refers to an application program, a virtual machine, or a user interface program operated in the host, and is subjected to a determination of whether the host software is authorized to access the portable storage device when the data stored in the portable storage device is accessed.

The portable storage device 210, also known as a portable secure storage (PSS), includes a control unit 212, a ROM 214, a RAM 216, a security module 218, and a storage area 220.

The control unit 212 manages and controls the entire operation of the portable storage device. A processor for a low-power embedded board such as an Advanced RISC Machine (ARM) processor may be employed.

The ROM 214 is a device for storing codes for operations of the portable storage device 210, and is not allowed to be accessed by any external device from the portable storage device 210.

The RAM 216 is a memory used in the operations of the portable storage device 210, and is not allowed to be accessed by any external device from the portable storage device 210.

The security module 218 is hardware for executing inspection of integrity or for determining authentication of host software requesting the portable storage device 210 to transmit data while it operates as a host 200 or in the host 200. The security module 218 has a cryptographic accelerator, that reduces the burden on the control unit 212, as well as processes authentication of the host 200 or host software in a fast manner. The security module 218 performs functions similar to a trusted platform module (TPM) of a trust computing group (TCG).

The storage area 220 is a space for storing user information, and may be, for example, a NAND, NOR, or a Flash memory. A portion of the storage area 220 is used as a space for storing information required to authenticate the host or host software.

In order to protect user information stored in the portable storage device 210, the host 200 connected to the portable storage device 210 is required to obtain authorization to access to the portable storage device, and then the host software may be normally operated. Therefore, the portable storage device 210 determines whether or not the host 200 is authorized to access the portable storage device 210 and whether or not the host software has been modified. If the host 200 is determined not to have authorization to access the portable storage device 210, the host 200 is prohibited from reading the data stored in the portable storage device 210.

In addition, a virtual machine may migrate between hosts in a state migration environment. Therefore, although the host 200 may be authorized, host software, such as the virtual machine for reading the data, may not be authorized to access the portable storage device. In this environment, even when the authorized host 200 is connected to the portable storage device 210, a virtual machine operating in the host may be infected by malware. Since the malware on the virtual machine may attempt to access user information stored in the portable storage device 210, the virtual machine should be authorized to access the portable storage device 210 in order to protect user information.

Figure 3:
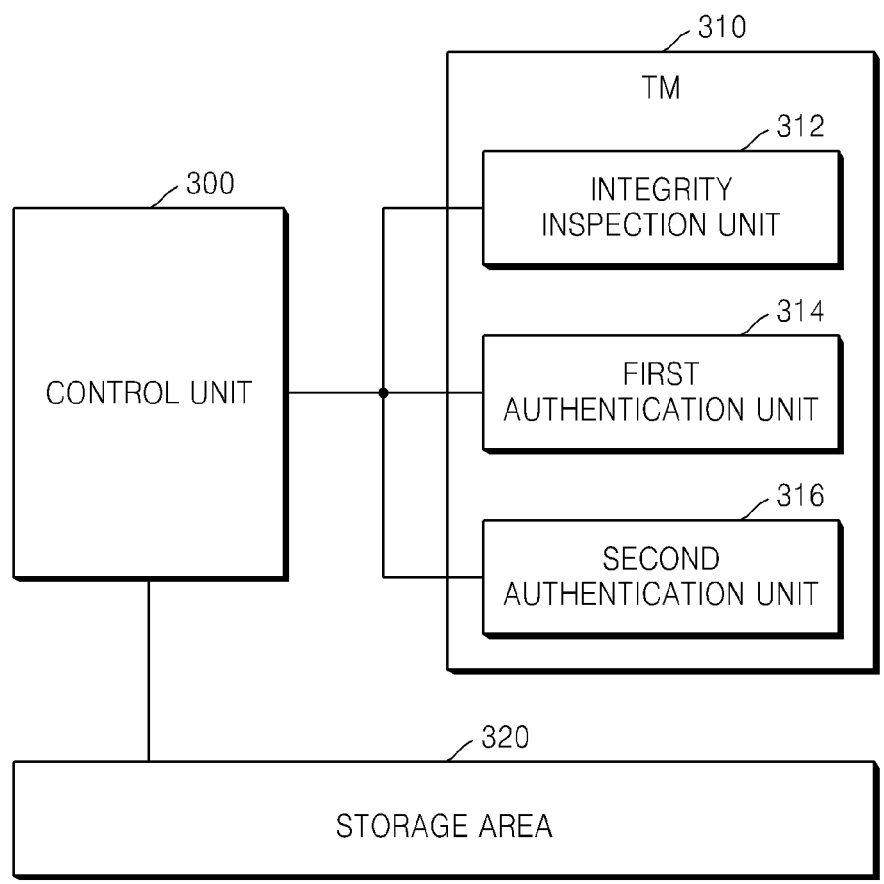
FIG. 3 is a block diagram illustrating an apparatus for authorizing a host in a portable storage device according to an exemplary embodiment of the present invention.

FIG. 3 is a block diagram illustrating an apparatus for determining whether the host is authorized to access a portable storage device in the portable storage device according to an exemplary embodiment of the present invention.

Referring to FIG. 3, the apparatus authenticates the host, verifies the integrity of the host software, and authenticates the host software requesting transmission of data when the host accesses the portable storage device.

The apparatus for authorizing a host to access a portable storage device comprises an integrity inspection unit 312, a first authentication unit 314, a second authentication unit 316, and a control unit 300. Although FIG. 3 shows that the integrity inspection unit 312, the first authentication unit 314, and the second authentication unit 316 are included in the security module 310, the integrity inspection unit 312, the first authentication unit 314, and the second authentication unit 316 it may be included in other configurations.

The integrity inspection unit 312 verifies the integrity of the host software requesting to transmit data. The host (not shown) having the host software is secure-booted. The host generates information $TIM_{HOST}$ on the integrity of the host software based on the result of the secure booting. The information $TIM_{HOST}$ may be generated in the form of a hash value of a hash function. Since the secure booting has been already described, its description will be omitted. The integrity inspection unit 312 receives information $TIM_{HOST}$ of the host software from the host (not shown), and verifies integrity of the host software using the received information. Alternatively, if the security module is included in the host for the secure booting of the host, the integrity inspection unit 312 may previously store information $TIM_{HOST}$. The integrity inspection unit 312 may transmit the result of inspection to the control unit 300.

The first authentication unit 314 determines whether the host (now shown) is authorized to access the portable storage device. The host generates and stores a host identification key $IK_{HOST}$ required to obtain authorization for accessing the data stored in the portable storage device. When the portable storage device is connected to the host, the host transmits the host identification key $IK_{HOST}$ to the first authentication unit 314 in the portable storage device. The first authentication unit 314 authenticates the host based on the host identification key $IK_{HOST}$ received from the host.

The second authentication unit 316 determines whether the host software is authorized to access the portable storage device. The host (not shown) generates and stores a host software identification key $IK_{HOST\ SOFTWARE}$. The host software identification key $IK_{HOST\ SOFTWARE}$ is used to obtain authorization for the host software to access the portable storage device. When the portable storage device is connected to the host, the host transmits the host software identification key $IK_{HOST\ SOFTWARE}$ to the second authentication unit 316 of the portable storage device. The second authentication unit 316 authenticates the host software based on the host software identification key $IK_{HOST\ SOFTWARE}$ received from the host.

The control unit 300 permits or rejects a data transmission request from the host based on the verification result of the integrity inspection unit 312, the authentication determination of the first authentication unit 314, and the authentication determination of the second authentication unit 316.

For example, if the integrity verification of the host software in the integrity inspection unit 312 or the host access authentication in the first authentication unit 314 is unsuccessful, the control unit 300 may reject the data transmission request from the host software. In this case, the control unit 300 allows the host to use only the function of the security module 310 of the portable storage device. Herein, this state is called a RED state.

For example, if both of the integrity verification of the host software and the host access authorization are successful, the control unit 300 may permit a data transmission request of the host software for data stored in a predetermined portion of the storage area 320 of the portable storage device. The remaining portions except for the predetermined portion of the storage area 320 may store an application program or user data. What kind of data may be stored in a portion of the storage area 320 and the remaining area is not limited to the aforementioned embodiment, but may be determined in various ways depending on user's needs. In addition, the size of the portion of the storage area may be determined in various ways depending on user's needs. Herein, this state is called a YELLOW state.

In addition, the data stored in the portion of the storage area may be a virtual machine suspended and stored by another host for state migration. In this case, the suspended virtual machine may be loaded and resumed in the host. When the virtual machine resumed in the host requests to transmit the data stored in the remaining area of the portable storage device, the second authentication unit 316 authenticates the resumed virtual machine. The resumed virtual machine may be different host software which requests the portable storage device to transmit data.

When access authorization for the host software such as the resumed virtual machine is successful, the control unit 300 may permit a data transmission request of the host software for the data stored in the entire storage area of the portable storage device. Herein, this state is called a GREEN state.

Figure 4:
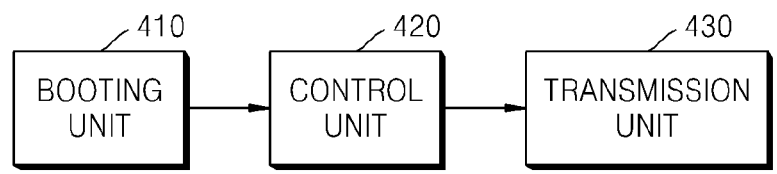
FIG. 4 is a block diagram illustrating an apparatus for providing information for authorizing a host according to an exemplary embodiment of the present invention.

FIG. 4 is a block diagram illustrating an apparatus for providing information to determine whether the host is authorized to access a portable storage device in the portable storage device according to an exemplary embodiment of the present invention.

Referring to FIG. 4, the apparatus for providing information to authenticate a host may be included in the host, and is an apparatus for transmitting, to the portable storage device, information required for the portable storage device to determine whether the host is authorized to access the portable storage device. The apparatus for providing information to authorize a host comprises a booting unit 410, a control unit 420, and a transmission unit 430.

The booting unit 410 is for secure booting the host. The booting unit 410 may execute a secure booting using a security module (not shown) included in the host. Alternatively, the booting unit 410 may execute the secure booting using a security module included in the portable storage device. A user may execute the secure booting using a security module included in the portable storage device by modifying settings for the host booting.

The control unit 420 generates information $TIM_{HOST}$ on the integrity of the host software base on the result of the secure booting from the booting unit 410. The information $TIM_{HOST}$ on the integrity may be generated in the form of a hash value of a hash function.

In addition, the control unit 420 generates a host identification key $IK_{HOST}$ and a host software identification key $IK_{HOST\ SOFTWARE}$.

The transmission unit 430 transmits information $TIM_{HOST}$ on the integrity of the host software generated by the control unit 420, the host identification key $IK_{HOST}$, and the host software identification key $IK_{HOST}$ SOFTWARE to the portable storage device. It should be noted that the host software refers to software which requests transmission of data stored in the portable storage device. Also, the host software may include a virtual machine read by the portable storage device and resumed by the host.

Figure 5A:
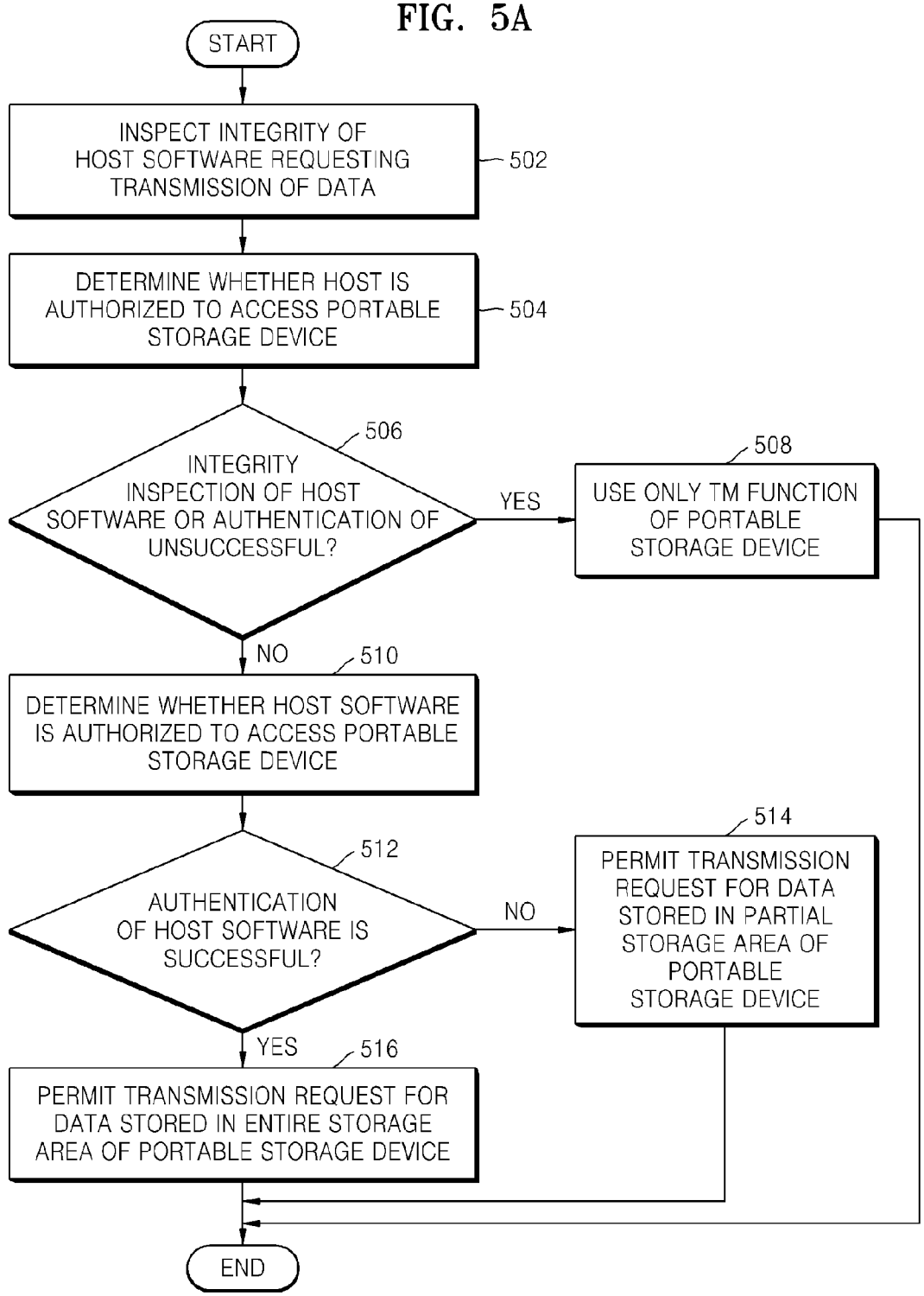
FIG. 5A is a flowchart illustrating a method of authorizing a host in a portable storage device according an exemplary embodiment of the present invention.

FIG. 5A is a flowchart illustrating a method of authorizing a host in a portable storage device according to an exemplary embodiment of the present invention.

Referring to FIG. 5A, in operation 502, the portable storage device inspects and verifies integrity of host software which requests data transmission. The integrity inspection of the host software may be executed when the information $TIM_{HOST}$ is received from the host subjected to a secure booting.

In operation 504, the portable storage device authenticates the connected host. The host is authenticated based on the host identification key $IK_{HOST}$ received from the host as described with respect to FIG. 4.

If the integrity inspection of the host software or the authorization of the host is unsuccessful in operation 506, the portable storage device is controlled to reject the data transmission request from the host software and use only the security module function in operation 508 (i.e., the RED state).

If both of the integrity inspection of the host software and the host access authorization are successful in operation 506, the portable storage device authenticates the host software in operation 510. The host software is authenticated based on the host software identification key $IK_{HOST\ SOFTWARE}$ received from the host as described with respect to FIG. 4.

Alternatively, the portable storage device may accept a data transmission request from the host software for the data stored in a predetermined portion of the storage area before authenticating the host software. In addition, the data stored in the predetermined portion may be a virtual machine suspended by another host for state migration. In this case, the host software may be a virtual machine read by the portable storage device and resumed by the host.

If the portable storage device fails to authorize the host software in operation 512, the portable storage device accepts the data transmission request from the host software for the data stored in a predetermined portion of the storage area of the portable storage device in operation 514 (i.e., a YELLOW state). In addition, if the portable storage device authenticates the host software in operation 512, the portable storage device may accept the data transmission request from the host software for the data stored in the entire storage area in operation 516 (i.e., a GREEN state).

As described above, the portable storage device may provide the host with a three service states including RED, YELLOW, and GREEN states. The portable storage device in a RED state in operation 508 allows the host to use only a security module function of the portable storage device and does not allow the host to access the storage area. The portable storage device in a YELLOW state in operation 514 allows the host to use the security module function as well as a portion of the storage area. The portable storage device in a GREEN state in operation 516 allows the host to use the security module function as well as access the entire storage area.

For example, the portable storage device stays in a RED state immediately after the portable storage device is connected to the host. The portable storage device may switch to a YELLOW state when the integrity inspection and authorization for the host are completed. The portable storage device may switch to a GREEN state when authorization for the host software is completed.

Figure 5B:
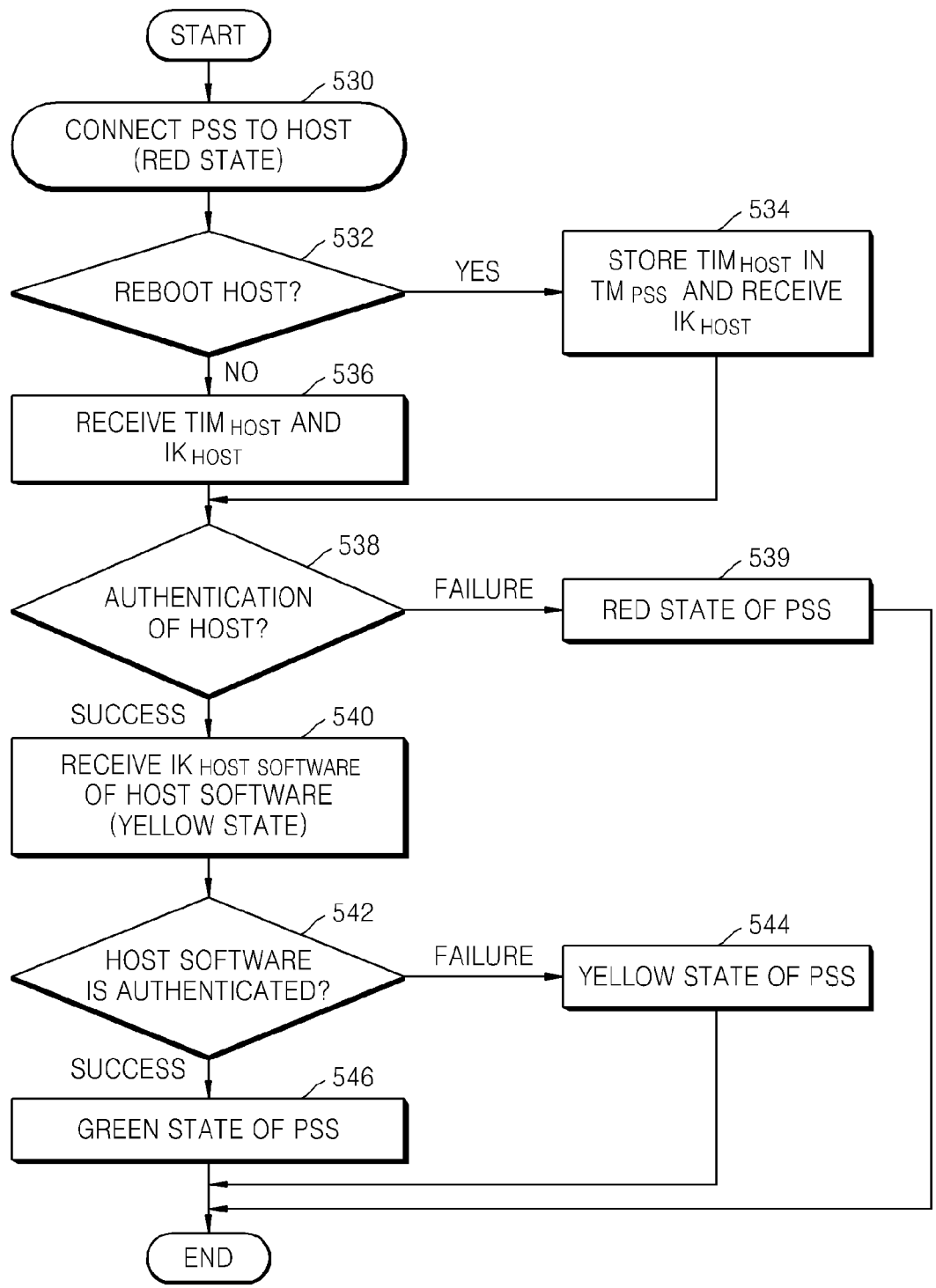
FIG. 5B is a flowchart illustrating a method of authorizing a host in a portable storage device according another exemplary embodiment of the present invention.

FIG. 5B is a flowchart illustrating a method of authenticating a host in a portable storage device according to another exemplary embodiment of the present invention.

Referring to FIG. 5B, the portable storage device such as a portable secure storage (PSS) stays in a RED state when it is connected to the host in operation 530.

In operation 532, the host that does not have the security module should be rebooted, whereas the host that has the security module is not rebooted. When the host that does not have the security module is rebooted, the portable storage device generates and stores information $TIM_{HOST}$ on the integrity of the host software using the integrated security module $TM_{PSS}$ in operation 534. In addition, the portable storage device receives the host identification key $IK_{HOST}$ from the host.

When the host is not rebooted in operation 532, the portable storage device receives information $TIM_{HOST}$ on the integrity of the host software and the host identification key $IK_{HOST}$ from the security module $TM_{HOST}$ included in the host in operation 536.

In operation 538, the portable storage device determines whether the host is authorized to access the storage area of the portable storage device using the information $TIM_{HOST}$ and the host identification key $IK_{HOST}$. If it is determined that the host is authenticated as a result of the determination, the portable storage device switches to a YELLOW state in operation 540, and allows the host to access a portion of the storage area of the portable storage device. If it is determined that the host is not authorized as a result of the determination, the portable storage device remains in a RED state in operation 539.

The portable storage device is provided with the host software identification key $IK_{HOST\ SOFTWARE}$ from the host software in operation 540. Then, the portable storage device determines whether or not the host software is authorized to access the storage area of the portable storage device in operation 542.

If the authorization for the host software is successful, the portable storage device switches to a GREEN state in operation 546. On the other hand, if the authorization for the host software is unsuccessful, the portable storage device is kept in a YELLOW state in operation 544.

Figure 6A:
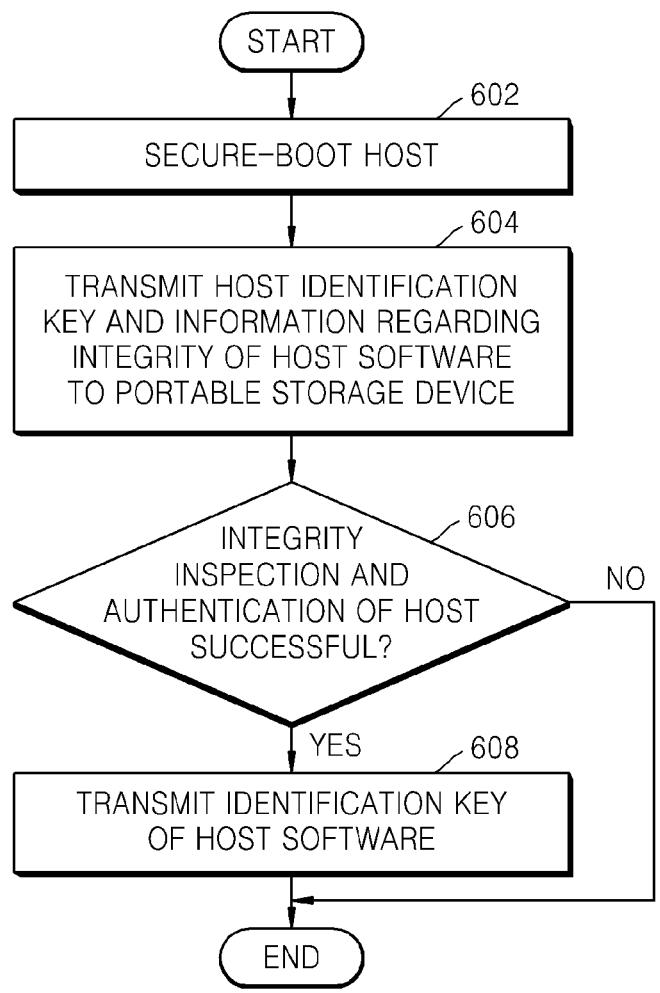
FIG. 6A is a flowchart illustrating a method of providing information for authorizing a host according to an exemplary embodiment of the present invention.

FIG. 6A is a flowchart illustrating a method of providing information for authorizing a host according to an exemplary embodiment of the present invention.

Referring to FIG. 6A, the host is secure-booted in operation 602.

In operation 604, the host transmits, to the portable storage device, information $TIM_{HOST}$ on the integrity of the host software generated based on the result of the secure booting and the host identification key $IK_{HOST}$. Alternatively, when the host does not have the security module, the host may transmit only the host identification key $IK_{HOST}$ to the portable storage device.

In operation 606, the integrity of the host software is inspected and verified, and the host authentication is performed. If the integrity inspection and the authentication of the host authority are successful, the host transmits the host software identification key $IK_{HOST\ SOFTWARE}$ to the portable storage device in operation 608. When the data transmission request is accepted by the portable storage device, the host may receive the data from the portable storage device.

Figure 6B:
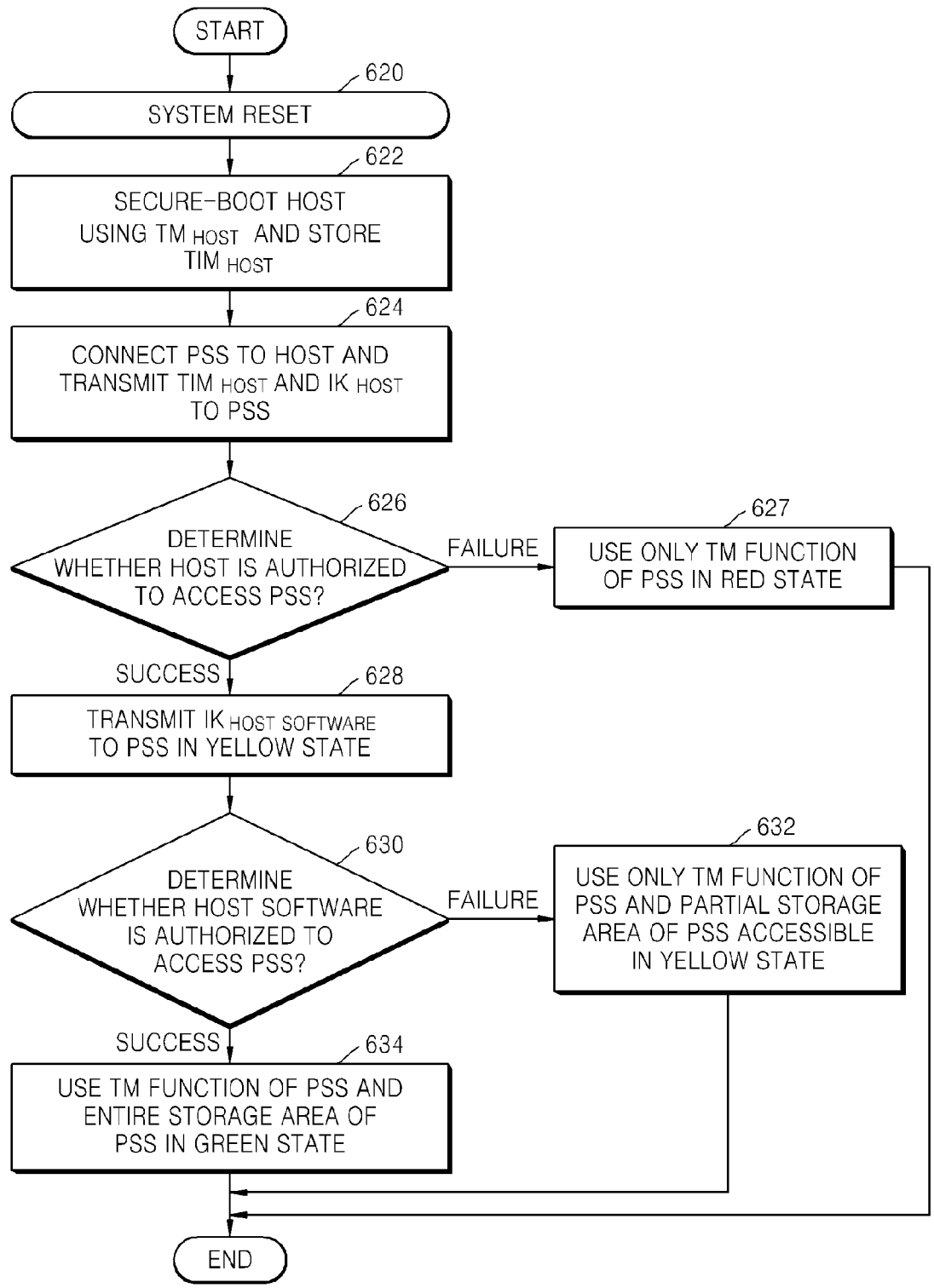
FIG. 6B is a flowchart illustrating a method of providing information for authorizing a host according to another exemplary embodiment of the present invention.

FIG. 6B is a flowchart illustrating a method of providing information for authorizing a host according to another exemplary embodiment of the present invention.

Referring to FIG. 6B, the host is reset in operation 620, and the secure booting is performed using the security module $TM_{HOST}$ included in the host. For the secure booting, the security module $TM_{HOST}$ included in the host confirms that a boot loader has not changed and confirms that an operating system or a VMM has not changed. If the secure booting is completed, a target integrity metric $TIM_{HOST}$, which ensures that there is no change in the host software during the booting, is stored in the security module $TM_{HOST}$ in operation 622.

Then, when the portable storage device is connected to the host, the security module $TM_{HOST}$ transmits the target integrity metric $TIM_{HOST}$ and the host identification key $IK_{HOST}$ to the portable storage device in operation 624. The portable storage device determines authentication using the received information in operation 626. It should be noted that information such as $TIM_{HOST}$ may be stored in a portion of the storage area of the portable storage device, and the security module $TM_{PSS}$ in the portable storage device authenticates the authority of the host using the information such as $TIM_{HOST}$.

If the authorization of the host is unsuccessful, the host is allowed to use only a function of the security module (i.e., RED state) in operation 627. On the other hand, if the authorization of the host is successful, the portable storage device is allowed to change its internal state to a YELLOW state.

Then, the host transmits the host software identification key $IK_{HOST\ SOFTWARE}$ to the portable storage device in operation 628. The security module $TM_{PSS}$ of the portable storage device determines whether the host software is authorized to access the storage area using the identification key $IK_{HOST\ SOFTWARE}$ in operation 630. If the authorization is successful, the portable storage device changes its internal state into a GREEN state, and permits access to the entire stored data in operation 634. On the other hand, when the authorization is unsuccessful, the state of the portable storage device is kept in a YELLOW state.

Alternatively, when the host does not have the security module, the host asks a user whether or not the secure rebooting should be performed. If a user accepts reboots the host, the secure booting may be performed by considering the security module $TM_{PSS}$ of the portable storage device as a security module of the host. As a result of the secure booting, the target integrity metric $TIM_{HOST}$ is stored in the security module $TM_{PSS}$, and used to authorize the host together with the host identification key $IK_{HOST}$.

Figure 7:
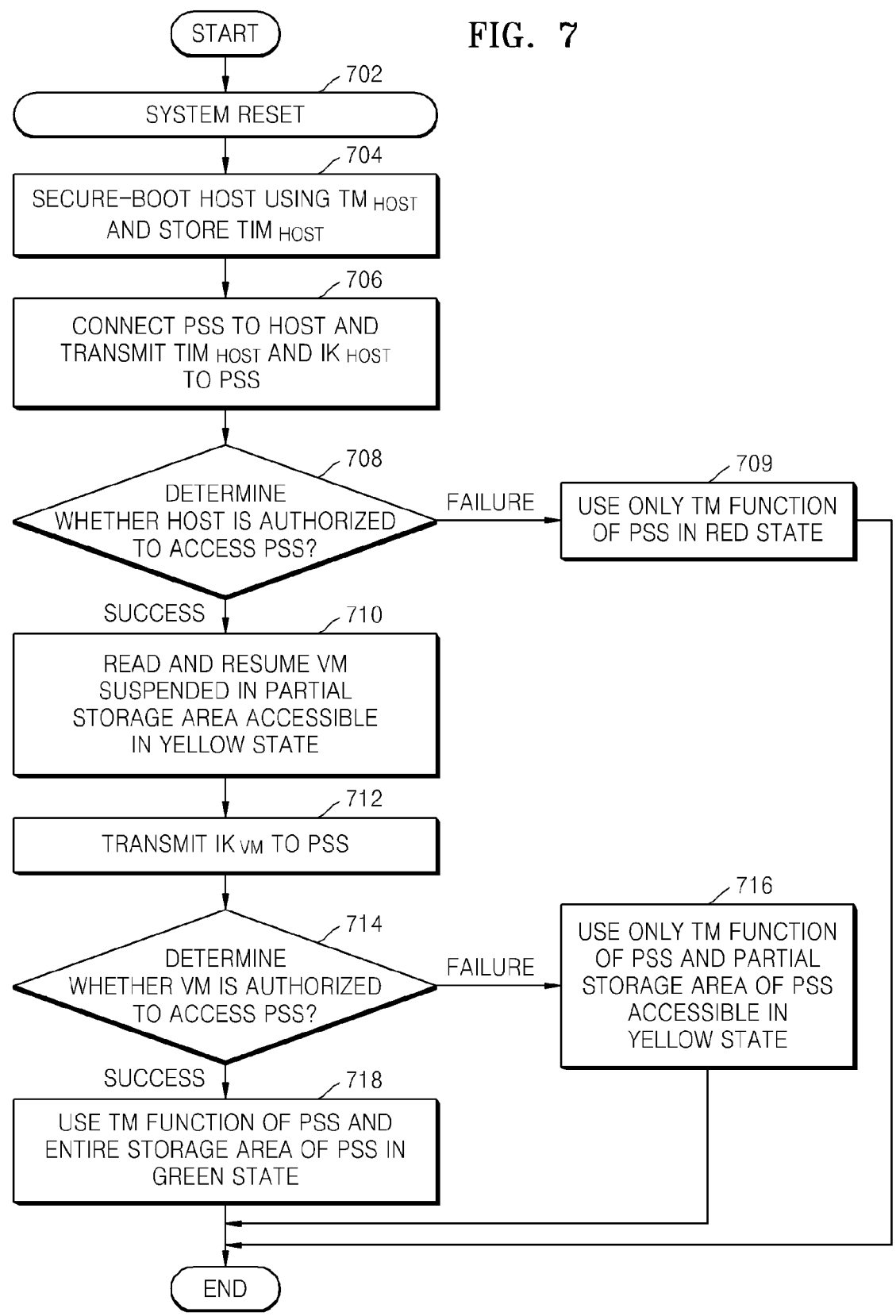
FIG. 7 is a flowchart illustrating an exemplary usage of a portable storage device in a state migration environment.

FIG. 7 is a flowchart illustrating an exemplary usage of a portable storage device in a state migration environment.

Referring to FIG. 7, operations 702, 704, 706, 712, and 716 are respectively similar to operations 620, 622, 628, and 632 described above with reference to FIG. 6B, and therefore those descriptions will be omitted. In an exemplary embodiment, operation 712 includes $IK_{VM}$, which is transmitted to the PSS.

The portable storage device such as a portable secure storage (PSS) determines whether or not the host has authority to access the storage area of the portable storage device in operation 708. If it is determined that the host has the authority, the portable storage device switches to a YELLOW state. In the YELLOW state, a virtual machine suspended for state migration is stored in the storage area of the portable storage device allowed to be accessed by the host. The host loads and resumes the suspended virtual machine in operation 710. The resumed virtual machine becomes host software and requests authority to access the portable storage device in operation 714. If the virtual machine is authorized, the portable storage device permits the virtual machine to access the entire storage area of the portable storage device in operation 718.

According to the present invention, since an unauthorized user is prevented from accessing a storage area of a portable storage device, it is possible to securely protect user information stored in a portable storage device in the event of loss or theft of the portable storage device, or from unauthorized access by a host infected with malware.

According to the present invention, it is possible to securely protect a virtual machine and user information from an unauthorized host or malware in a virtualization based state migration technology.

The invention can also be embodied as computer readable codes on a computer readable recording medium. The computer readable recording medium is any data storage device that can store data which can be thereafter read by a computer system. Examples of the computer readable recording medium may include read-only memory (ROM), random-access memory (RAM), CD-ROMs, magnetic tapes, floppy disks, optical data storage devices. In an alternative embodiment, the computer readable recording medium may be carrier waves (such as data transmission through the Internet). The computer readable recording medium can also be distributed over a network coupled to computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of authorizing a host to access a portable storage device, the method comprising:
   verifying integrity of host software requesting the portable storage device to transmit data;
   determining whether the host is authorized to access the portable storage device; and
   determining whether the host software is authorized to access the portable storage device,
   wherein the verifying of the integrity of the host software comprises a security module of the portable storage device receiving information about the host software from the host and an integrity inspection unit of the security module analyzing the information about the host software in the portable storage device.

2. The method according to claim 1,
   wherein the host is secure-booted.

3. The method according to claim 1, wherein the determining whether the host is authorized to access the portable storage device is based on a host identification key received from the host.

4. The method according to claim 1, wherein the determining whether the host software is authorized to access the portable storage device is based on a host software identification key received from the host.

5. The method according to claim 1, further comprising, if the integrity of the host software is not verified or if it is determined that the host is not authorized to access the portable storage device, rejecting a data transmission request from the host software.

6. The method according to claim 5, further comprising, if the integrity of the host software is verified and if the it is determined that the host is authorized to access the portable storage device, permitting a data transmission request from the host software for data stored in a predetermined portion of a storage area of the portable storage device.

7. The method according to claim 6, wherein the data stored in the predetermined portion of the storage area includes a virtual machine suspended by another host for state migration, and
   wherein the host software includes a virtual machine read from the portable storage device and resumed by the host.

8. The method according to claim 6, further comprising, if it is determined that the host software is authorized to access the portable storage device, permitting the data transmission request from the host software for the data stored in an entire storage area of the portable storage device.

9. The method according to claim 7, wherein a remaining portion except for the predetermined portion of the storage area includes an application program or user data.

10. The method according to claim 1, wherein the host includes one of a personal computer, a personal digital assistant (PDA), a wireless communication terminal, and a digital television (DTV) set.

11. The method according to claim 1, wherein the portable storage device includes one of a universal serial bus (USB) memory card, a compact flash (CF) card, and a secure digital (SD) card.

12. The method according to claim 1, wherein the host software includes one of a virtual machine operated in the host, an application program operated in the host, and a user interface program.

13. An apparatus for authorizing a host to access a portable storage device, the apparatus comprising:
   a security module comprising:
      an integrity inspection unit to verify in a verification, integrity of host software requesting the portable storage device to transmit data;
      a first authentication unit to determine in a first determination, whether the host is authorized to access the portable storage device;
      a second authentication unit determine in a second determination, whether the host software is authorized to access the portable storage device; and
      a control unit configured to control transmitting the data to the host based on results of the verification, the first determination, and the second determination,
   wherein the integrity inspection unit of the security module receives information about the host software from the host and to analyzes the information about the host software in the portable storage device.

14. The apparatus according to claim 13, wherein the host is secure-booted.

15. The apparatus according to claim 13, wherein the first authentication unit is configured to determine whether the host is authorized to access the portable storage device based on a host identification key received from the host.

16. The apparatus according to claim 13, wherein the second authentication unit is configured to determine whether the host software is authorized to access the portable storage device based on a host software identification key received from the host.

17. The apparatus according to claim 13, wherein if the integrity of the host software is not verified or if it is determined that the host is not authorized to access the portable storage device, the control unit is configured to reject a data transmission request from the host software.

18. The apparatus according to claim 17, wherein if the integrity of the host software is verified and if the it is determined that the host is authorized to access the portable storage device, the control unit is configured to permit the data transmission request from the host software for data stored in a predetermined portion of a storage area of the portable storage device.

19. The apparatus according to claim 18, wherein the data stored in a predetermined portion of the storage area of the portable storage device includes a virtual machine suspended by another host for state migration, and
   wherein the host software includes a virtual machine read from the portable storage device and resumed by the host.

20. The apparatus according to claim 18, wherein if it is determined that the host software is authorized to access the portable storage device, the control unit is configured to permit the data transmission request from the host software for the data stored in an entire storage area of the portable storage device.

21. The apparatus according to claim 19, wherein remaining portions except for the predetermined portion of the storage area includes an application program or user data.

22. The apparatus according to claim 13, wherein the host includes one of a personal computer, a personal digital assistant (PDA), a wireless communication terminal, and a digital television (DTV) set.

23. The apparatus according to claim 13, wherein the portable storage device includes one of a universal serial bus (USB) memory card, a compact flash (CF) card, and a secure digital (SD) card.

24. The apparatus according to claim 13, wherein the host software includes one of a virtual machine operated in the host, an application program operated in the host, and a user interface program.

25. A method of providing information for authorizing a host to access a portable storage device, the method comprising:
secure-booting the host;
transmitting information about host software generated by the secure booting and a host identification key to a security module of a portable storage device and analyzing the information about the host software by an integrity inspection unit of the security module of the portable storage device; and
if integrity inspection of the host software and authentication of the host are successful, transmitting a host software identification key to the portable storage device,
wherein the host software requests transmission of data stored in the portable storage device.

26. The method according to claim 25, wherein the host software includes a virtual machine read from the portable storage device and resumed by the host.

27. The method according to claim 25, wherein the secure booting is performed by a security module included in the host or the portable storage device.

28. An apparatus for providing information for authorizing a host to access a portable storage device, the apparatus comprising:
a booting unit configured to secure-boot the host;
a control unit configured to generate information about the host software based on a result of the secure booting, a host identification key, and a host software identification key; and
a transmission unit configured to transmit information about the host software, a host identification key, and a host software identification key to the portable storage device,
wherein the host software requests transmission of data stored in the portable storage device, and
wherein the portable storage device comprises a security module comprising an integrity inspection unit to analyze the information about the host software in the portable storage device.

29. The apparatus according to claim 28, wherein the host software includes a virtual machine read from the portable storage device and resumed by the host.

30. The apparatus according to claim 28, wherein the booting unit secure-boots the host by using a security module included in the host or the portable storage device.

31. A non-transitory computer-readable medium having a computer program embodied thereon, the computer program for causing a computer to execute a method of authorizing a host to access a portable storage device, the method comprising:
verifying integrity of host software requesting the portable storage device to transmit data;
determining whether the host is authorized to access the portable storage device; and
determining whether the host software is authorized to access the portable storage device,
wherein the verifying of the integrity of the host software comprises a security module of the portable storage device receiving information about the host software from the host and an integrity inspection unit of the security module analyzing the information about the host software by an integrity inspection unit in the portable storage device.

32. A non-transitory computer-readable medium having a computer program embodied thereon, the computer program for causing a computer to execute a method of providing information for authorizing a host, the method comprising:
secure-booting the host;
transmitting information about host software generated by the secure booting and a host identification key to a security module of a portable storage device and analyzing the information about the host software by an integrity inspection unit of the security module of the portable storage device; and
if integrity inspection of the host software and authentication of the host are successful, transmitting a host software identification key to the portable storage device,
wherein the host software requests transmission of data stored in the portable storage device.

* * * * *